United States Patent
Sachse et al.

(10) Patent No.: US 7,018,192 B2
(45) Date of Patent: Mar. 28, 2006

(54) APPARATUS FOR HEAT TREATMENT OF OBLONG ARTICLES

(75) Inventors: Jürgen Sachse, Ålsgårde (DK); Niels Åge Madsen, Smørum (DK)

(73) Assignee: Ingeniorfirmaet Lytzen A/S, Herlev (DK)

(*) Notice: Subject to any disclaimer, the term of this patent is extended or adjusted under 35 U.S.C. 154(b) by 25 days.

(21) Appl. No.: 10/450,586

(22) PCT Filed: Dec. 11, 2001

(86) PCT No.: PCT/DK01/00818

§ 371 (c)(1),
(2), (4) Date: Jun. 12, 2003

(87) PCT Pub. No.: WO02/47894

PCT Pub. Date: Jun. 20, 2002

(65) Prior Publication Data

US 2004/0032061 A1    Feb. 19, 2004

(30) Foreign Application Priority Data

Dec. 12, 2000   (DK) ............................... 2000 01860

(51) Int. Cl.
   *B29C 35/02* (2006.01)
(52) U.S. Cl. ............... 425/182; 425/66; 425/383
(58) Field of Classification Search ............ 425/66, 425/182, 404, 446, 383; 264/211.17
See application file for complete search history.

(56) References Cited

U.S. PATENT DOCUMENTS

| | | | | | |
|---|---|---|---|---|---|
| 3,659,350 | A | * | 5/1972 | McCullough | 34/639 |
| 4,110,062 | A | * | 8/1978 | Summers | 425/71 |
| 5,146,660 | A | * | 9/1992 | Ritter | 28/274 |
| 6,129,879 | A | * | 10/2000 | Bersted et al. | 264/211.14 |

FOREIGN PATENT DOCUMENTS

| | | |
|---|---|---|
| DE | 19903171 | 8/2000 |
| FR | 2737285 | 1/1997 |

* cited by examiner

*Primary Examiner*—Donald Heckenberg
(74) *Attorney, Agent, or Firm*—Donald S. Dowden; Cooper & Dunham LLP

(57) ABSTRACT

An apparatus for heat treatment of oblong articles, such as monofilaments, multifilaments, tapes or webs of plastics, comprises a fixed bottom member (2) and a cover member (3) hingedly secured thereto along one long side, where the cover member (3) in the closed state together with the bottom member (2) define a hot-air channel (12). This hot-air channel extends lengthwise through the apparatus between the bottom member (2) and the cover member (3) from an inlet (14) to an outlet (15) in their respective ends in the apparatus. Means are provided for sealingly closing the slit (17) between abutting portions of the bottom member (2) and the cover member (3). These means for closing the slit (17) on the side of the apparatus being opposite the hinged side of the cover member (3) comprise a sluicing means (16). The sluicing means (16) is adapted to allow a lateral introduction of separate oblong articles into the hot-air channel (12) through a feeding track without completely opening said channel.

6 Claims, 2 Drawing Sheets

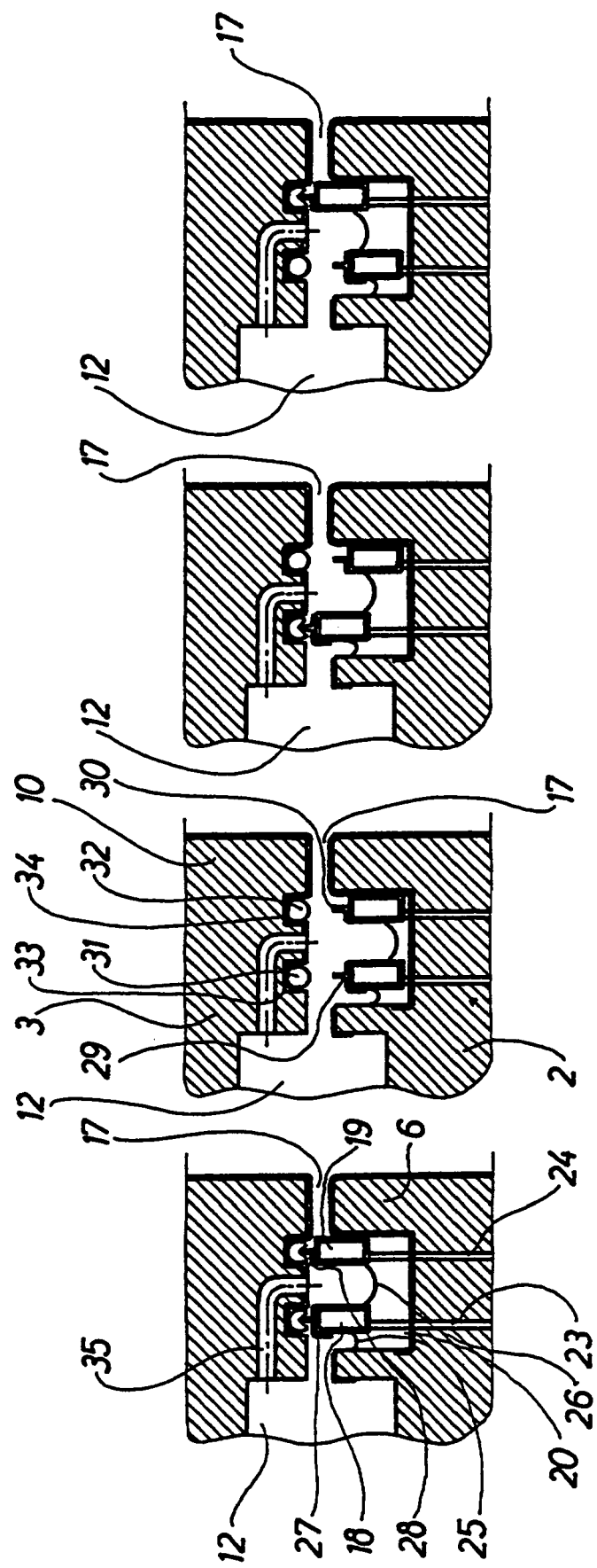

APPARATUS FOR HEAT TREATMENT OF OBLONG ARTICLES

TECHNICAL FIELD

The invention relates to an apparatus for heat treatment of oblong articles, such as monofilaments, multifilaments, tapes or webs of plastics, said apparatus comprising a fixed bottom member and a cover member hingedly secured thereto along one long side, where the cover member in the closed state together with the bottom member define a hot-air channel during operation, said hot-air channel extending lengthwise through the apparatus between said bottom member and said cover member from an inlet to an outlet at their respective ends in said apparatus, whereby means are provided for sealingly closing the slit between abutting portions of said bottom member and said cover member.

BACKGROUND ART

Apparatuses are known for heat treatment of various monofilaments, narrow tapes or belts, packing tapes, multifilaments, tapes and other webs of plastics. Such apparatuses comprise a cover member and a bottom member hingedly interconnected and defining a hot-air channel when closed and optionally interlocked, said hot-air channel extending from an inlet at one end of the apparatus to an outlet at the opposite end of said apparatus. The apparatus comprises equipment for providing a flow of hot air at a suitable temperature which can be up to 300° C., but which is usually in the range of from approximately 180 to 200° C. While passing through the hot-air channel, the article in question is subjected to a suitable stretching, which in combination with the heat ensures the desired processing. The apparatuses of this type can be up to 6 m long and present an internal width inside the hot-air channel of up to approximately 2 m. Such an apparatus is usually used for a continuous processing of the articles in question and can operate non-stop for a very long period of time, such as approximately 1 month. A good result depends on a uniform action, but the action can be disadvantageously affected in case it is necessary for some reason to open the cover member, such as in case an unsatisfactory number of articles advanced in parallel through the hot-air channel are damaged and it is desired to introduce fresh articles in order to ensure the productive capacity. As a result, all the articles are damaged and must therefore be replaced.

BRIEF DESCRIPTIONS OF THE INVENTION

The object of the invention is to provide an apparatus allowing an introduction of oblong articles into the hot-air channel while said apparatus is continuously operating.

The apparatus according to the invention is characterised in that the means for closing the slit comprise a sluicing means on the side of said apparatus being positioned opposite the hinged side of the cover member, said sluicing means being adapted to allow a lateral introduction of separate oblong articles into the hot-air channel through a feeding track without opening said hot-air channel completely.

As a result, the user of the apparatus can introduce new articles into the hot-air channel without necessitating an opening of said hot-air channel and without the temperature therein being disadvantageously affected. Such an introduction is allowed by the separate oblong article initially being introduced into the sluicing means while retained at both ends of the apparatus and subsequently into the hot-air channel so as finally to be connected in a conventionally known manner to the advancing and stress-subjecting devices.

According to a particularly simple embodiment, the sluicing means may according to the invention comprise a pair of bars being substantially vertically displaceable relative to one another, said bars being supported by the bottom member and adapted to sealingly engage adjacent portions of the cover member independent of one another when said cover member is in the closed state, where the bars are connected to adjacent fixed portions of the bottom member in such a manner that the flow of air below the bars is prevented in any position of said bars. These bars are of a suitable length substantially corresponding to the length of the apparatus from the inlet to the outlet of the hot-air channel.

According to the invention the inner side of the bar adjacent the hot-air channel when seen relative to the feeding track of the sluicing means may particularly advantageously be connected to the fixed portion of the bottom member by means of a sealing oblong strip material, such as a blanket of glass tissue, and the two bars may be interconnected by means of of a similar oblong strip material with the result that the necessary prevention of the flow of air below the bars is ensured in a particularly simple manner.

Furthermore according to the invention, each bar may comprise a strip on the side adjacent the cover member in order to sealingly engage an associated oblong sealing means in the cover member when said cover member is in the closed state. As a result, the necessary sealing against the cover member is ensured in a particularly simple manner.

Moreover, the movement of the bars may according to the invention advantageously be controlled by means of a plurality of pneumatic cylinders.

Finally according to the invention, the oblong sealing means in the cover member may be in form of hoses of a material, such as rubber, whereby the co-acting with the bars on the bottom member is particularly efficient.

BRIEF DESCRIPTION OF THE DRAWINGS

The invention is explained in greater detail below with reference to the accompanying drawings, in which FIGS. 2 to 5 illustrate on a larger scale the portions surrounding a sluicing means in FIG. 1 in various states of use.

BEST MODES FOR CARRYING OUT THE INVENTION

Figure 1:
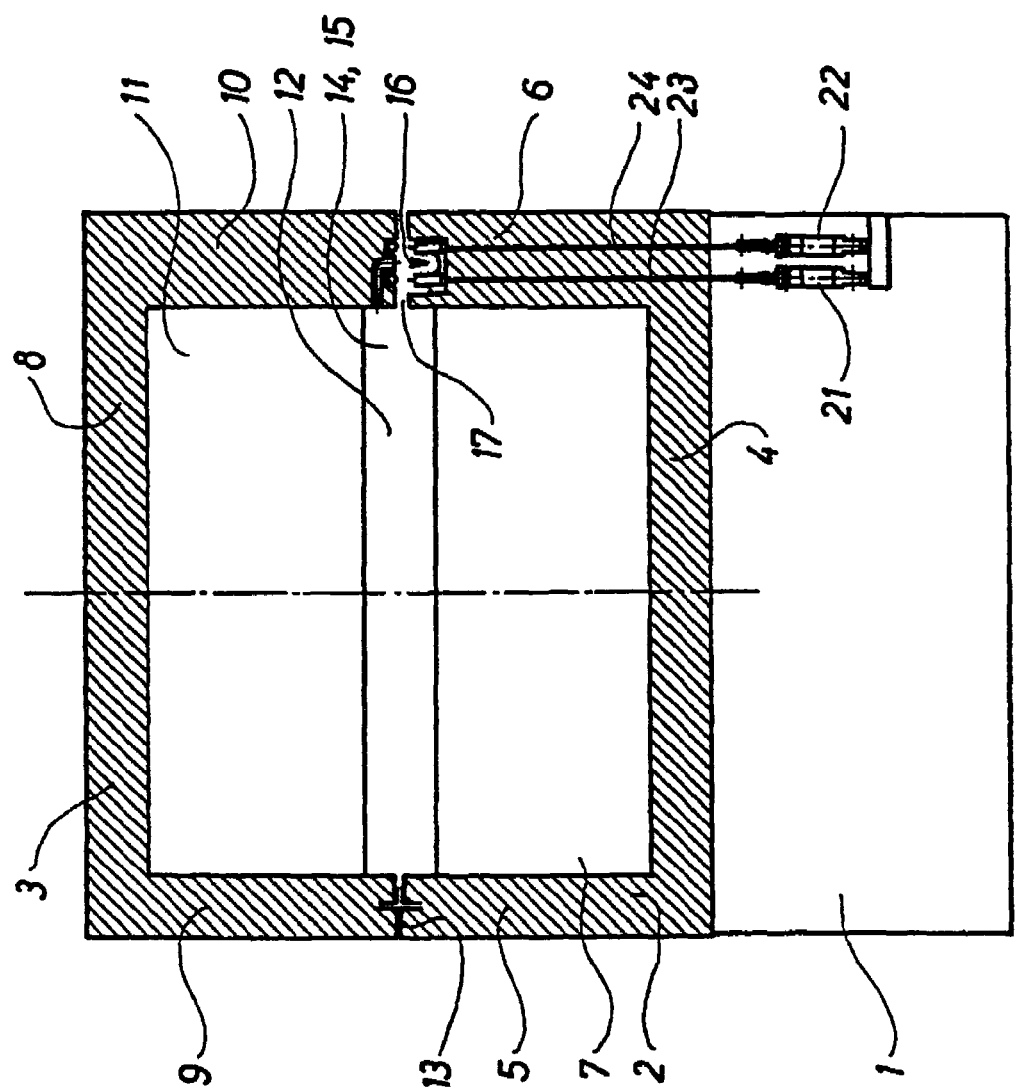
FIG. 1 is a diagrammatic, sectional view of an apparatus according to the invention, whereby parts have been removed for the sake of clarity.

The apparatus shown in FIG. 1 comprises a base 1, a bottom member 2 and a cover member 3. The bottom member 2 rests on the base 1 and comprises a lowermost wall 4 and four side walls 5, 6 and 7. Correspondingly, the cover member 3 comprises an uppermost wall 8 and four side walls 9, 10 and 11. The interior of the bottom member 2 and the cover member 3, respectively, is provided with conventionally known equipment for providing a flow of hot air fed to and removed from a hot-air channel 12. This hot-air channel 12 is defined between the bottom member 2 and the cover member 3 when said members are in the collapsed state in connection with a turning about a suitable hinge member 13. As mentioned above, FIG. 1 is a cross sectional view of he apparatus, and the apparatus is usually relatively oblong. Thus, the hinge member 13 is positioned in one longitudinal side of the apparatus.

The hot-air channel 12 extends between an inlet 14 and an outlet 15 arranged at their respective ends of the apparatus and defined between the respective end walls 7, 11 of the bottom member 2 and the cover member 3.

The side of the apparatus opposite the hinge 13 is provided with a sluicing means 16. This sluicing means 16 comprises portions of the side walls 6 and 10 of both the bottom member 2 and the cover member 3. These portions are adapted to cooperate in the slit 17 provided by said side walls 6 and 10 when the cover member 3 is tipped downwards into the closing position shown in FIG. 1.

As clearly illustrated in FIGS. 2 to 5, the sluicing means 16 comprises two bars 18 and 19 of their respective box-shaped profiles. These bars extend along the apparatus in a recess 20 provided for this purpose in the side wall 6 of the bottom member 2. These bars 18 and 19 are supported by their respective sets of pneumatic cylinders 21 and 22, respectively, through associated piston bars 23 and 24, respectively, cf. FIG. 1.

The bar 18 placed innermost in the slit 17 is connected to the inner side of the recess 20 by means of a strip-shaped glass cloth or blanket 25, i.e. a blanket being air-tight and reinforced by means of glass tissue or the like material. A corresponding blanket 26 is mounted between the innermost bar 18 and the outermost bar 19. The latter glass blankets 25 and 26 are mounted on the bars 18 and 19 by means of strip-shaped fittings 27 and 28, respectively, on the upper side of the respective bars 18 and 19. These strip-shaped fittings 27 and 28 comprise their respective upward webs 29 and 30, respectively. These webs are adapted to sealingly engage hose-shaped sealing means 31 and 32, respectively, in their respective grooves 33 and 34, respectively, in the adjacent portion of the side wall 10 of the cover member 3. The hose-shaped sealing means 31 and 32 are secured in said grooves in a suitable manner and such that they closely fit the cover member 3. They may suitably be made if a silicon rubber.

At the ordinary use of the apparatus, the oblong articles to be subjected to a heat treatment are advanced through the compressed-air channel 12 while continuously moved, said movement being continued for many hours and days.

While the apparatus is used, the sluicing means is placed in the state shown in FIG. 2 with the bars 18 and 19 moved upwards into an uppermost position in which the strip—shaped fittings 27 and 28 sealingly engage the sealing means 31 and 32 through the upward webs 29 and 30. The tight glass blankets 25 and 26 have the effect that hot air cannot flow below the bars 25 and 26 and further outwards into the surroundings. Each bar 18 and 19 is driven by means of five to six pneumatic cylinders when it is a question of an approximately 6 m long apparatus.

Before the apparatus is used, the sluicing means is positioned in the state shown in FIG. 3. The ordinary operation of the apparatus allows some of the oblong articles to go into pieces, but when a predetermined percentage, i.e. approximately 10%, has been broken, some of the damaged articles may be replaced by fresh articles. Previously, the latter was carried out by the cover member 3 being opened, but such an opening involved a damaging of almost all the oblong articles due to the lowering of the temperature caused by such an opening. Therefore, all the articles had to be replaced. The use of the sluicing means 16 renders it possible to carry out the replacement without causing a damaging of the remaining articles not to be replaced. The latter replacement is carried out by the bars 18 and 19 being moved first into the position shown in FIG. 4 and subsequently into the position shown in FIG. 5. In this manner it is possible to gradually introduce new articles from the right to the left into the compressed-air channel 12 when seen relative to the drawing without opening a free passage for the hot air present therein through the slit 17. When the replacement has been completed, the sluicing means 16 is returned to the position shown in FIG. 2.

An air duct 35 is provided in the cover member 3 in order to ensure a pressure equalization in the area between the two bars 18 and 19. This air duct 35 extends between the hot-air channel 12 and the area between the two hose-shaped sealing means 31 and 32. The above glass blankets are, of course, dimensioned in such a manner that the bars 18 and 19 can carry out the above movements freely.

The invention has been described with reference to a preferred embodiment. Many modifications can be carried out without thereby deviating from the scope of the invention.

What is claimed is:

1. An apparatus for heat treatment of oblong articles, said apparatus comprising a fixed bottom member (2) and a cover member (3) hingedly secured thereto along one long side, where the cover member (3) in a closed state together with the bottom member (2) define a hot-air channel (12) during operation, said hot-air channel (12) extending lengthwise through the apparatus between said bottom member (2) and said cover member (3) from an inlet (14) to an outlet (15) at their respective ends in said apparatus, whereby means (16) are provided for sealingly closing a slit (17) between abutting portions of said bottom member (2) and said cover (3) member, characterised in that the means (16) for closing the slit (17) comprise a sluicing means (16) on the side of said apparatus being positioned opposite the hinged side of the cover member (3), said sluicing means (16) performing the function of allowing a lateral introduction of separate oblong articles into the hot-air channel (12) through a feeding track without pivoting said cover member (3) relative to said bottom member (2).

2. An apparatus for heat treatment of oblong articles, said apparatus comprising a fixed bottom member (2) and a cover member (3) hingedly secured thereto along one long side, where the cover member (3) in a closed state together with the bottom member (2) define a hot-air channel (12) during operation, said hot-air channel (12) extending lengthwise through the apparatus between said bottom member (2) and said cover member (3) from an inlet (14) to an outlet (15) at their respective ends in said apparatus, whereby means (16) are provided for sealingly closing a slit (17) between abutting portions of said bottom member (2) and said cover (3) member, characterised in that the means (16) for closing the slit (17) comprise a sluicing means (16) on the side of said apparatus being positioned opposite the hinged side of the cover member (3), said sluicing means (16) performing the function of allowing a lateral introduction of separate oblong articles into the hot-air channel (12) through a feeding track without opening said hot-air channel completely;

characterised in that the sluicing means (16) comprises a pair of bars (18, 19) substantially vertically displaceable relative to one another, said bars being supported by the bottom member (2) and adapted to sealingly engage adjacent portions of the cover member (3) independent of one another when said cover member is in the closed state, and that the bars (18, 19) are connected to adjacent fixed portions of the bottom member (2) in such a manner that the flow of air below the bars (18, 19) is prevented in any position of said bars.

3. An apparatus according to claim 2, characterised in that the inner side of the bar (18) adjacent the hot-air channel when seen relative to the feeding track of the sluicing means (16) is connected to the fixed portion of the bottom member (2) by means of a sealing oblong strip material (25), and that the two bars are interconnected by means of an oblong strip material (26).

4. An apparatus according to claim 2, characterised in that each bar (18, 19) on the uppermost side adjacent the cover member comprises a strip (27, 28) for sealingly engaging an associated oblong sealing means (31, 32) in the cover member (3) when said cover member is in the closed state.

5. An apparatus according to claim 2, characterised in that the movement of the bars (18, 19) is controlled by means of a plurality of pneumatic cylinders (21, 22).

6. An apparatus according to claim 4, characterised in that the oblong sealing means (31, 32) in the cover member (3) are in form of hoses of silicon rubber.

* * * * *